US012734439B2

(12) United States Patent
Nabeshima et al.

(10) Patent No.: US 12,734,439 B2
(45) Date of Patent: Sep. 15, 2026

(54) MAINTENANCE SYSTEM, DESIGN MAINTENANCE METHOD, DESIGN MAINTENANCE SERVE EQUIPMENT, AND DESIGN MAINTENANCE PROGRAM FOR WIRELESS FACILITY

(71) Applicant: NTT, Inc., Tokyo (JP)

(72) Inventors: Masayoshi Nabeshima, Musashino (JP); Tomoaki Ogawa, Musashino (JP)

(73) Assignee: NTT, Inc., Tokyo (JP)

( * ) Notice: Subject to any disclaimer, the term of this patent is extended or adjusted under 35 U.S.C. 154(b) by 349 days.

(21) Appl. No.: 18/570,901

(22) PCT Filed: Jun. 17, 2021

(86) PCT No.: PCT/JP2021/023054
§ 371 (c)(1),
(2) Date: Dec. 15, 2023

(87) PCT Pub. No.: WO2022/264364
PCT Pub. Date: Dec. 22, 2022

(65) Prior Publication Data

US 2024/0293740 A1 Sep. 5, 2024

(51) Int. Cl.

*A63F 13/327* (2014.01)
*A63F 13/35* (2014.01)
*A63F 13/45* (2014.01)
*H04W 16/18* (2009.01)
*H04W 84/12* (2009.01)

(52) U.S. Cl.

CPC ............ *A63F 13/45* (2014.09); *A63F 13/327* (2014.09); *A63F 13/35* (2014.09); *H04W 16/18* (2013.01); *H04W 84/12* (2013.01)

(58) Field of Classification Search
None
See application file for complete search history.

(56) References Cited

U.S. PATENT DOCUMENTS

2015/0181372 A1* 6/2015 Huang .................. H04W 4/029 455/456.1
2015/0190709 A1* 7/2015 Moorthy ................ G09B 19/00 463/9

OTHER PUBLICATIONS

JP Pub. 2020141395 Google Patents English Translation—https://patents.google.com/patent/JP2020141395A/en?oq=JP2020141395 to Yamamoto et al, Sep. 2, 2020 (Year: 2020).*

(Continued)

*Primary Examiner* — Damon J Pierce
(74) *Attorney, Agent, or Firm* — Fish & Richardson P.C.

(57) ABSTRACT

Provided is a design maintenance system that gives game-like elements to design maintenance work of wireless equipment. A design maintenance tool used by a worker transmits wireless information such as a channel number measured in accordance with the design maintenance work to a design maintenance server. A game execution unit of the design maintenance server digitizes the received wireless information to generate a progress value necessary for progress of a game. A transmission unit of the design maintenance server transmits the progress value of the game to the design maintenance tool. The design maintenance tool progresses the game by using the received progress value, and displays a progress state to workers.

6 Claims, 21 Drawing Sheets

WIRELESS DESIGN MAINTENANCE TOOL 50-1 (T = 1)

| CHANNEL NUMBER | BSSID | RSSI |
|---|---|---|
| 36 | 12:34:56:a7:b8:c9 | -40 |
| 40 | 12:34:56:ab:c7:e8 | -45 |

WIRELESS DESIGN MAINTENANCE TOOL 50-2 (T = 2)

| CHANNEL NUMBER | BSSID | RSSI |
|---|---|---|
| 44 | 12:34:56:17:e8:d7 | -48 |
| 48 | 12:34:56:f3:b1:c3 | -50 |

WIRELESS DESIGN MAINTENANCE TOOL 50-3 (T = 3)

| CHANNEL NUMBER | BSSID | RSSI |
|---|---|---|
| 36 | 12:34:56:31:4c:a1 | -40 |
| 48 | 12:34:56:c2:e1:d5 | -45 |

(56) References Cited

OTHER PUBLICATIONS

JP Pub. 2021022145 Google Patents English Translation—https://patents.google.com/patent/JP2021022145A/en?oq=JP2021022145 to Matsumoto et al, Feb. 18, 2021 (Year: 2021).*

[No Author Listed], “Gamification utilization technology and verification in business settings,” NTT Technical Journal, 2015, 27(4):42-45, 9 pages (with machine translation).

Sourcenext.com [online], “Special Heroes Detective Conan (2020 edition),” available on or before Nov. 2020, retrieved on May 2021, retrieved from URL<https://www.sourcenext.com/product/pc/tok/pc_tok_003057/>, 11 pages (with machine translation).

* cited by examiner

| PLAYER | DAMAGE SCORE |
| --- | --- |
| A | 1500 |
| B | 300 |
| C | 1000 |

Fig. 11

WIRELESS DESIGN MAINTENANCE TOOL 50-1 (T = 1)

| CHANNEL NUMBER | BSSID | RSSI |
| --- | --- | --- |
| 36 | 12:34:56:a7:b8:c9 | -40 |
| 40 | 12:34:56:ab:c7:e8 | -45 |

WIRELESS DESIGN MAINTENANCE TOOL 50-2 (T = 2)

| CHANNEL NUMBER | BSSID | RSSI |
| --- | --- | --- |
| 44 | 12:34:56:17:e8:d7 | -48 |
| 48 | 12:34:56:f3:b1:c3 | -50 |

WIRELESS DESIGN MAINTENANCE TOOL 50-3 (T = 3)

| CHANNEL NUMBER | BSSID | RSSI |
| --- | --- | --- |
| 36 | 12:34:56:31:4c:a1 | -40 |
| 48 | 12:34:56:c2:e1:d5 | -45 | t=1 t=3

Fig. 14

WIRELESS DESIGN MAINTENANCE TOOL 50'-1 (T = 1)

| CHANNEL NUMBER | BSSID | RSSI | THROUGHPUT |
|---|---|---|---|
| 36 | 12:34:56:a7:b8:c9 | -40 | 82.3M |

WIRELESS DESIGN MAINTENANCE TOOL 50'-2 (T = 2)

| CHANNEL NUMBER | BSSID | RSSI | THROUGHPUT |
|---|---|---|---|
| 44 | 12:34:56:17:e8:d7 | -48 | 61.5M |

WIRELESS DESIGN MAINTENANCE TOOL 50'-3 (T = 3)

| CHANNEL NUMBER | BSSID | RSSI | THROUGHPUT |
|---|---|---|---|
| 36 | 12:34:56:31:4c:a1 | -40 | 75.8M | t=1 t=2 t=3

MAINTENANCE SYSTEM, DESIGN MAINTENANCE METHOD, DESIGN MAINTENANCE SERVE EQUIPMENT, AND DESIGN MAINTENANCE PROGRAM FOR WIRELESS FACILITY

CROSS-REFERENCE TO RELATED APPLICATIONS

This application is a National Stage application under 35 U.S.C. § 371 of International Application No. PCT/JP2021/023054, having an International Filing Date of Jun. 17, 2021, the disclosure of which is considered part of the disclosure of this application, and is incorporated by reference in its entirety into this application.

TECHNICAL FIELD

The present disclosure relates to a design maintenance system, a design maintenance method, a server device, and a design maintenance program for wireless equipment, and particularly to the design maintenance system, the design maintenance method, the server device, and the design maintenance program suitable for giving game-like elements to a design maintenance tool of a wireless LAN.

BACKGROUND ART

At the site of business, a so-called "gamification" has been studied in which rules and elements used in a game are applied to other things than the game to improve the user's will. For example, a case of utilizing gamification is described in the following NPL 1.

As a tool including game elements, typing software described in, for example, NPL 2 is known. In this tool, when characters appearing on a screen are correctly inputted from a keyboard, the game can be advantageously advanced. Thus, the tool can efficiently learn an input skill of the keyboard with pleasure by utilizing the game-like elements.

Incidentally, in a field of wireless LAN, a site survey is performed for design and maintenance. The site survey is a radio wave survey, and the survey is implemented in order to determine a design of the number of installed access points (AP), installation positions, radio wave intensity, a channel to be used, or the like, when a wireless LAN is newly constructed. In addition, the site survey is implemented not only when newly constructing the wireless LAN but also as a part of maintenance for the existing wireless LAN for the purpose of reviewing the number of installed APs. In the site survey, work for visualizing a wireless state is performed by using a dedicated tool.

FIG. 1 is a diagram showing a configuration of a passive survey which is a type of site survey. In FIG. 1, N design maintenance tools 10-1 to 10-N and one server 12 are shown. Hereinafter, when the design maintenance tools 10-1 to 10-N need not be distinguished from each other, a code with no suffix is used as in the "design maintenance tool 10". Similarly, when a plurality of elements of the same type exists and it need to be distinguished, the code with the suffix is used. On the other hand, when it is not necessary to distinguish them, the code with no suffix is attached to them.

The design maintenance tool 10 is a tool used for passive survey by individual workers. In the passive survey, each of the workers first takes in a drawing of a floor to be surveyed into the tool by using the design maintenance tool 10 (drawing taking-in unit). Next, a position on the drawing corresponding to the present position of the worker is clicked (click judgement unit). Thus, the radio wave is measured (channel scan unit), and a measurement result is transmitted to the server 12 (transmission unit).

The worker moves each place, clicks on a drawing coincident with the present position of the worker in the same way, and transmits the measurement result of the radio wave to the server 12. Such point measurement is performed in the entire area on the floor where the wireless LAN is desired to be used. The server 12 receives all the measurement results (reception unit) and visualizes a radio wave state in the entire area (wireless visualization unit).

FIG. 2 is a diagram showing the configuration of an active survey which is a type of site survey. In the active survey, each of the workers first takes in the drawing of the floor for executing the site survey into the tool by using the design maintenance tool 14 (drawing taking-in unit). Next, the worker clicks on the drawing that coincides with the current position of the worker (click judgement unit). Thus, the measurement of the throughput is started (throughput measurement unit).

In the measurement of the throughput, a large amount of packets are transmitted and received between the throughput measurement unit of the design maintenance tool 14 and the throughput measurement unit of the server 16. Thus, the throughput is measured and the result is transmitted to the server 16. The worker moves the place and clicks on the drawing coincident with the present position of the worker in the same way. Thus, the throughput is actually measured at various places on the floor, and the result is transmitted to the server 16. Such point measurement is performed at important points of the area on the floor where the wireless LAN is desired to be used. The server 16 receives all measurement results (reception unit) and visualizes actual measurement throughput in the area (wireless visualization unit).

CITATION LIST

Non Patent Literature

[NPL 1] "Gamification utilization technique and verification at business site", NTT technology journal, pp. 42-45, April 2015

[NPL 2] "Typing practice heroes detective Conan" https://www.sourcenext.com/product/pc/tok/pc_tok_003057/

SUMMARY OF INVENTION

Technical Problem

At the present time of reaching the "nevertiree era", it is more important for workers to work with pleasure. Therefore, it is expected that tools including game elements are generalized even in a field of design maintenance of wireless equipment. However, in the design maintenance tool of wireless equipment, there is no design maintenance tool having game-like elements at present.

The present disclosure has been made in view of the above-mentioned problems, and it is a first object to provide a design maintenance system that gives game-like elements to design maintenance work of wireless equipment.

In addition, a second object of the present disclosure is to provide a design maintenance method that gives the game-like elements to the design maintenance work of wireless equipment.

Further, a third object of the present disclosure is to provide a design maintenance server device that gives the game-like elements to the design maintenance work of wireless equipment.

Furthermore, a fourth object of the present disclosure is to provide a program for design maintenance that gives the game-like elements to the design maintenance work of wireless equipment.

Solution to Problem

A first aspect of the present disclosure is a design maintenance system used for design maintenance work of wireless equipment in order to achieve the above-mentioned purpose, the design maintenance system includes

- a design maintenance tool used by a worker of the design maintenance work, and
- a design maintenance server that transmits and receives information to and from the design maintenance tool by a communication, wherein
- the design maintenance tool
- executes wireless information transmission processing of transmitting wireless information measured in association with the design maintenance work to the design maintenance server,
- the design maintenance server
- executes processing of receiving the wireless information, progress value calculation processing that calculates a progress value necessary for progress of a game on the basis of the received wireless information, and
- progress value transmission processing of transmitting the progress value to the design maintenance tool, and
- further, the design maintenance tool preferably executes processing of progressing the game by using the received progress value, and
- processing of notifying the worker of a progress state of the game.

A second aspect of the present disclosure is a design maintenance method applied to design maintenance work of wireless equipment, the design maintenance method preferably includes

- a step of causing a design maintenance tool to transmit wireless information measured in association with the design maintenance work to a design maintenance server by using the design
- maintenance tool used by a worker of the design maintenance work and the design maintenance server that transmits and receives information to and from the design maintenance tool by a communication,
- a step of causing the design maintenance server to receive the wireless information,
- a step of causing the design maintenance server to calculate a progress value necessary for progress of a game on the basis of the received wireless information,
- a step of causing the design maintenance server to transmit the progress value to the design maintenance tool,
- a step of causing the design maintenance tool to progress the game by using the received progress value; and
- a step of causing the design maintenance tool to inform the workers of a progress of the game.

A third aspect of the present disclosure is a design maintenance server used for design maintenance work of wireless equipment, the design maintenance server preferably executes

- processing of receiving wireless information which is measured in association with the design maintenance work and transmitted toward the design maintenance server by a design maintenance tool used by a worker of the design maintenance work,
- processing of calculating a progress value necessary for progress of a game on the basis of the received wireless information, and processing of transmitting the progress value to the design maintenance tool.

A fourth aspect of the present disclosure is a design maintenance program executed in a design maintenance server used for design maintenance work of wireless equipment, wherein

- the design maintenance server includes a processor unit, and
- the design maintenance server causes the processor unit to preferably execute
- processing of causing the design maintenance server to receive wireless information measured in association with the design maintenance work by a design maintenance tool used by a worker of the design maintenance work,
- processing of calculating a progress value necessary for progress of a game on the basis of the wireless information, and processing of transmitting the progress value toward the design maintenance tool.

Advantageous Effects of Invention

According to the first to fourth aspects, game-like elements can be given to the design maintenance work of the wireless equipment.

BRIEF DESCRIPTION OF DRAWINGS

FIG. 11 shows an example of measurement results transmitted to the server at each of time point t=1, 2, and 3 in the timing chart shown in FIG. 10.

FIG. 14 shows an example of measurement results transmitted to the server at each of time point t=1, 2, and 3 in the timing chart shown in FIG. 13.

DESCRIPTION OF EMBODIMENTS

Embodiment 1

Configuration of Embodiment 1

Figure 1:
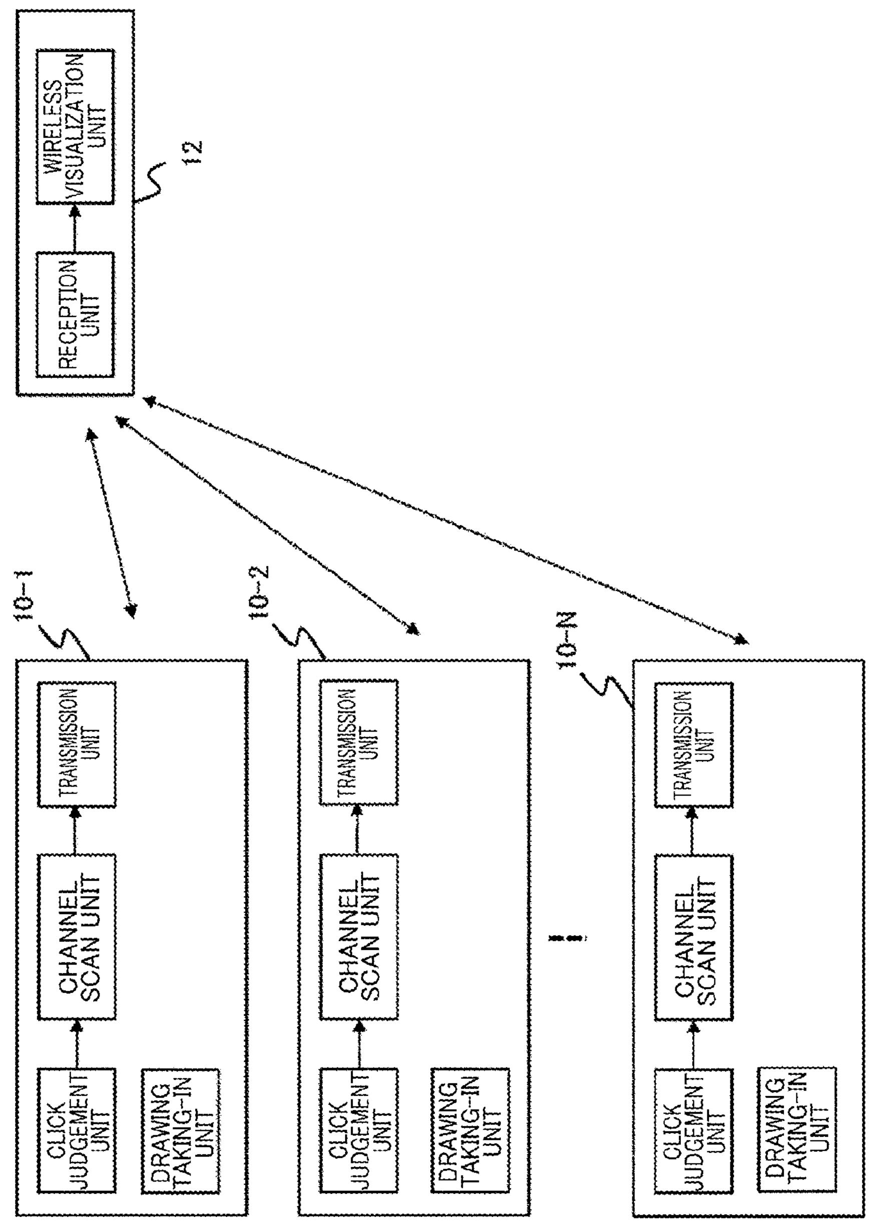
FIG. 1 is a diagram showing a configuration example of a conventional design maintenance system used in a passive survey which is a type of site survey.
Figure 2:
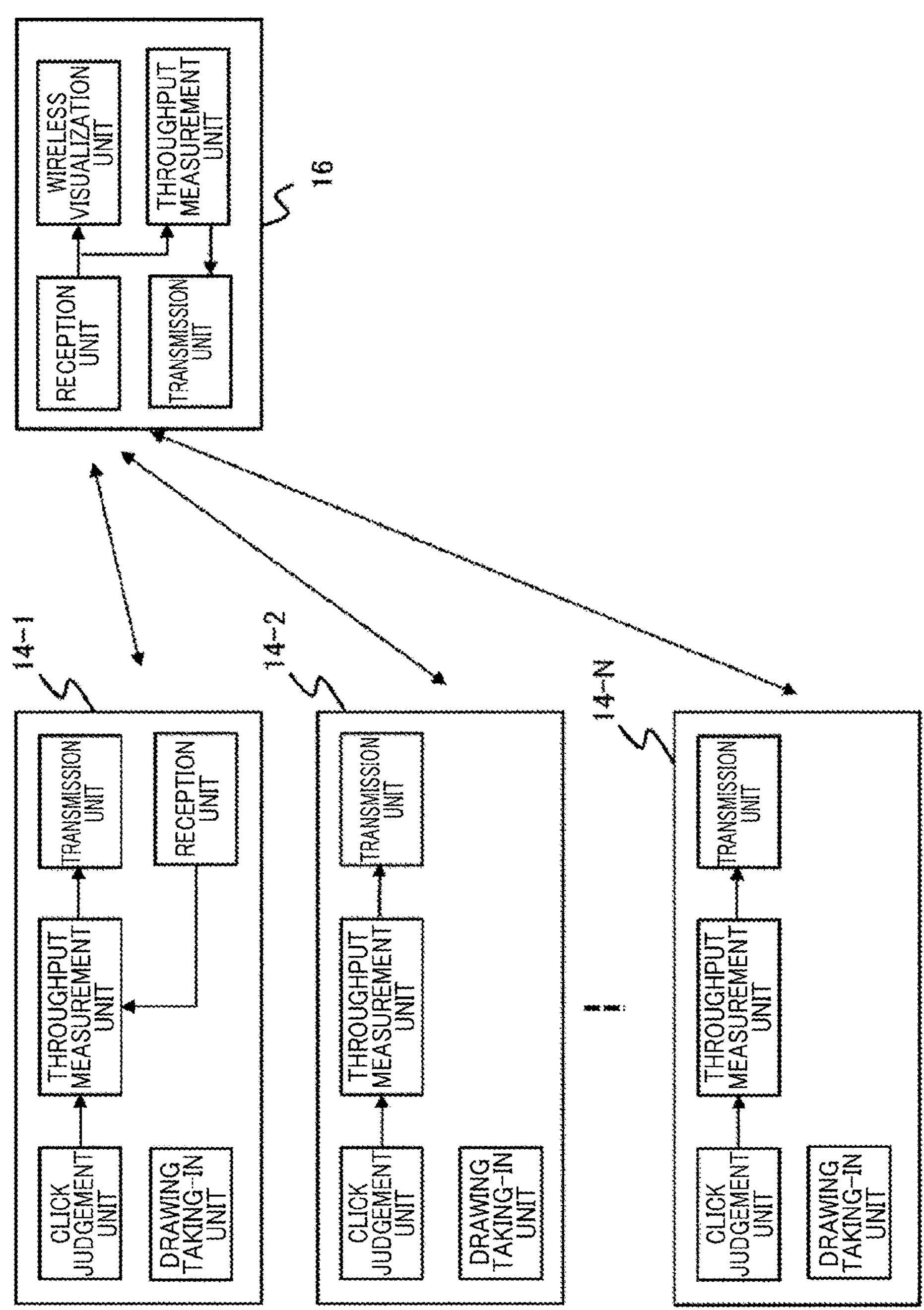
FIG. 2 is a diagram showing a configuration example of a conventional design maintenance system used in an active survey which is a type of site survey.
Figure 3:
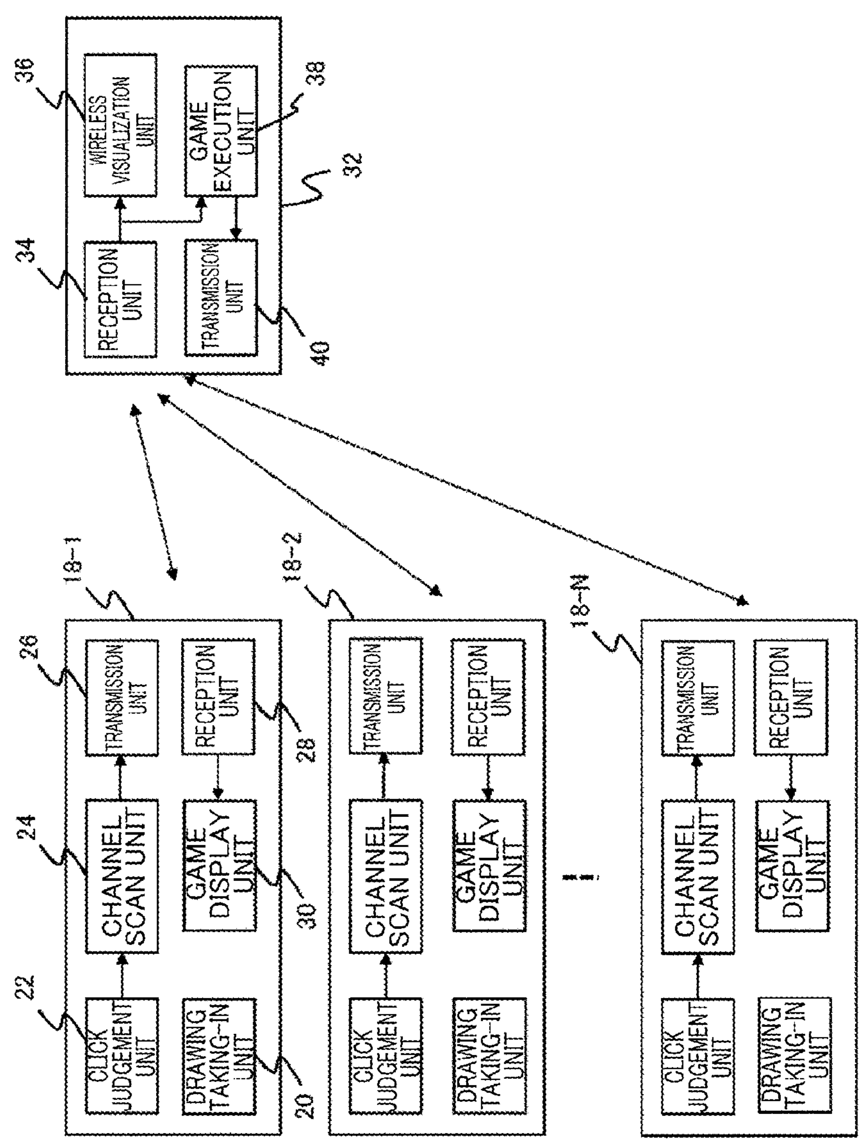
FIG. 3 is a diagram showing a configuration of a design maintenance system according to an embodiment 1 of the present disclosure.

FIG. 3 shows a configuration example of a design maintenance system of wireless equipment according to an embodiment 1 of the present disclosure. The design maintenance system of the present embodiment is used to implement a passive survey when newly constructing a wireless LAN.

A structure shown in FIG. 3 includes N design maintenance tools 18. The design maintenance tool 18 is a tool used by each worker to perform the passive survey.

Each design maintenance tool 18 includes a drawing taking-in unit 20, a click judgement unit 22, a channel scan unit 24, a transmission unit 26, a reception unit 28 and a game display unit 30. These are implemented by hardware such as a CPU, a memory, a communication interface, and an input/output interface including a display, and a program stored in the memory to be executed by the CPU. The program may be acquired by downloading through communication or may be acquired by reading from a recording medium storing the program.

The structure shown in FIG. 3 also includes one design maintenance server 32. The design maintenance server 32 includes a reception unit 34, a wireless visualization unit 36, a game execution unit 38, and a transmission unit 40. The design maintenance server 32 is implemented by hardware such as the CPU, the memory, and the communication interface, and a design maintenance program stored in the memory to be executed by the CPU. The design maintenance program may be acquired by downloading through communication or may be acquired by reading from a recording medium storing the program.

A worker who executes the passive survey takes in a floor drawing into the design maintenance tool 18 through the drawing taking-in unit 20 and clicks a position on the drawing coincident with a present position of the worker. The click judgement unit 22 detects a click and instructs the channel scan unit 24 to start channel scan. The channel scan unit 24 executes the channel scan and transmits the obtained wireless information to the design maintenance server 32 through the transmission unit 26.

For example, channels of 36, 40, 44, 48, 52, 56, 60, 64, 100, 104, 108, 112, 116, 120, 124, 128, 132, 136 and 140 are set in a 5 GHz band. The passive survey stays at each channel for a fixed time and waits for reception of a beacon frame transmitted from an existing AP. Then, when the beacon frame from the AP is received, wireless information included in the beacon frame is recorded. The number of pieces of wireless information recorded in one time survey varies depending on the number of existing APs. Hereinafter, the number is represented by "K".

The wireless information includes, for example, the following information.

1. A channel number
2. BSSID (Basic Service Set Identifier)
3. RSSI (Received Signal Strength Indicator)

Note that the BSSID is an identifier of a wireless access point in the wireless LAN. In addition, the RSSI is a value representing the intensity of the radio wave.

The design maintenance server 32 transmits the wireless information received by the reception unit 34 to the wireless visualization unit 36 and the game execution unit 38. The game execution unit 38 determines a progress value necessary for progressing the game on the basis of the wireless information transmitted from the design maintenance tool 18. The determined progress value is provided to all the design maintenance tools 18 through the transmission unit 40.

Figure 4:
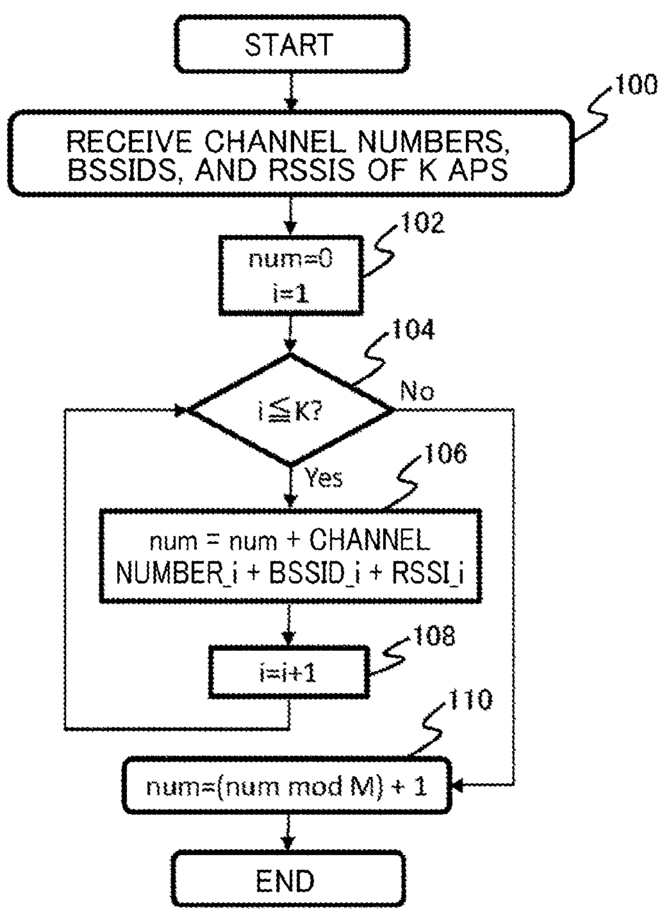
FIG. 4 is a flowchart for explaining a flow of processing performed by a server in order to calculate a progress value necessary for progressing a game according to the embodiment 1 of the present disclosure.

FIG. 4 is a flowchart for explaining a flow of processing executed by the design maintenance server 32 in order to calculate the above-mentioned progress value. The series of processes shown in FIG. 4 is executed to calculate one game progress value num for one time passive survey executed by the design maintenance tool 18.

In the routine shown in FIG. 4, the wireless information is first received from the design maintenance tool 18 (step 100). Here, specifically, wireless information about K APs recorded in one time passive survey, that is, channel numbers, BSSIDs and RSSIs for K APs are received.

After the above-described processing is completed, the progress value num is reset to "0", and the AP number i is set to "1" (step 102).

Next, success or failure of "i≤K" is determined. That is, it is discriminated whether or not the number i of the AP to be processed in this cycle is equal to or less than the total number K of the APs (step 104).

As a result, when "i≤K" is recognized, it can be determined that the current AP is one of the K sets. In this case, the progress value num is updated according to the following equation (1) (step 106).

$$num = num + \text{channel number\_i} + \text{BSSID\_i} + \text{RSSI\_i} \tag{1}$$

In the above equation (1), the channel number and the RSSI are defined by decimal numbers. On the other hand, the BSSID is expressed in 12 hexadecimal numbers, for example, such as "12:AB:34:CD:56:EF". Therefore, the BSSID must be converted into a decimal number according to the table below and then substituted into the above equation (1). For example, "12:AB:34:CD:56:EF" is converted into 96 as follows.

$$1+2+10+11+3+4+12+13+5+6+14+15=96 \tag{2}$$

TABLE 1

| | |
|---|---|
| A | 10 |
| B | 11 |
| C | 12 |
| D | 13 |
| E | 14 |
| F | 15 |

According to the above equation (1), the value obtained by adding the channel number_i, the BSSID_i (in the above example, "96") and the RSSI_i corresponding to the current AP number i to the current progress value num is set as a new progress value num.

When the update of the progress value num is completed, the AP number i is incremented (step 108), and then the step 104 is executed again. Then, the step 106 is repeated while i≤K is satisfied. As a result, the progress value num is finally a value obtained by summing up the channel numbers, BSSIDs and RSSIs of K APs.

When summing up for K APs is completed, i=K+1 is set in next step 108. As a result, the discrimination in the subsequent step 104 is denied. Thus, the conversion according to the following equation (3) is performed to the progress value num (step 110).

$$num = (num \bmod M) + 1 \tag{3}$$

The right side of the above equation (3) means that the progress value num obtained in step 106 is divided by M and 1 is added to the remaining value without being divided. In this case, the progress value num after conversion is an integer of 1 to M.

For example, when M is set to 6, the progress value num becomes a dice roll. The progress value num can be used for, for example, the sugoroku game. When M is 75, the progress value num can be used as the winning number of a bingo game. In addition, when M is set to 100, the progress value num can be used, for example, for the amount of damage to a raid boss in a raid battle.

The worker can select a game to be executed in the design maintenance tool 18. The selected contents are transmitted from the design maintenance tool 18 to the design maintenance server 32. The design maintenance server 32 determines an M value according to the type of the transmitted game. Then, the design maintenance server 32 provides the progress value num calculated by using the determined M to the design maintenance tool 18.

Figure 5A:
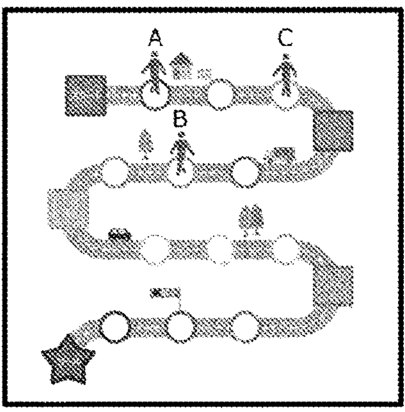
FIG. 5A is a diagram showing a first example of a game screen displayed on a design maintenance tool according to the embodiment 1 of the present disclosure.

FIG. 5A shows an example of a game screen displayed by the game display unit 30 of the design maintenance tool 18 when the sugoroku game is selected. In this case, the design maintenance server 32 provides the design maintenance tool 18 with an integer of 1 to 6 as the progress value num.

Figure 5B:
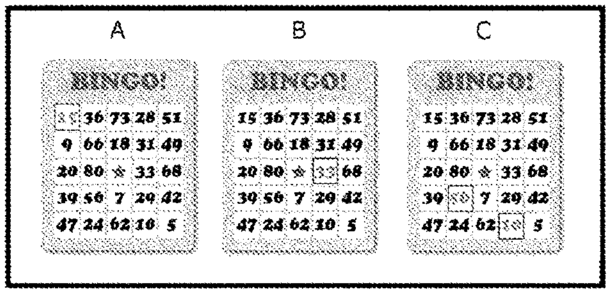
FIG. 5B is a diagram showing a second example of the game screen displayed on the design maintenance tool according to the embodiment 1 of the present disclosure.

FIG. 5B shows an example of the game screen displayed by the game display unit 30 of the design maintenance tool 18 when the bingo game is selected. In this case, the design maintenance server 32 provides the design maintenance tool 18 with an integer of 1 to 75 as the progress value num.

Figure 5C:
FIG. 5C is a diagram showing a third example of the game screen displayed on the design maintenance tool according to the embodiment 1 of the present disclosure.

FIG. 5C shows an example of the game screen displayed by the game display unit 30 of the design maintenance tool 18 when the raid battle is selected. In this case, the design maintenance server 32 provides the design maintenance tool 18 with an integer of 1 to 100 as the progress value num.

As described above, according to the design maintenance system of the present embodiment, the progress value num of the game can be generated based on the numerical value to be handled in accordance with the design maintenance work of the wireless equipment. Then, by providing the progress value to the design maintenance tool 18, game-like elements can be given to the design maintenance work.

Modification Example of Embodiment 1

Incidentally, in the embodiment 1 described above, the type of the game to be executed is selected by the design maintenance tool 18, and the type of the game is transmitted from the design maintenance tool 18 to the design maintenance server 32. However, the present disclosure is not limited thereto. For example, the type of the game may be determined to be one in advance, and the transmission of the type of the game may be eliminated. Alternatively, the design maintenance server 32 may determine the type of the game and transmit the determination result from the design maintenance server 32 to the design maintenance tool 18. This also applies to other embodiments described below.

Embodiment 2

Next, an embodiment 2 of the present disclosure will be described with reference to FIGS. 6 to 7 together with FIG. 5. The design maintenance system of the present embodiment is used to implement an active survey when newly constructing the wireless LAN.

Figure 6:
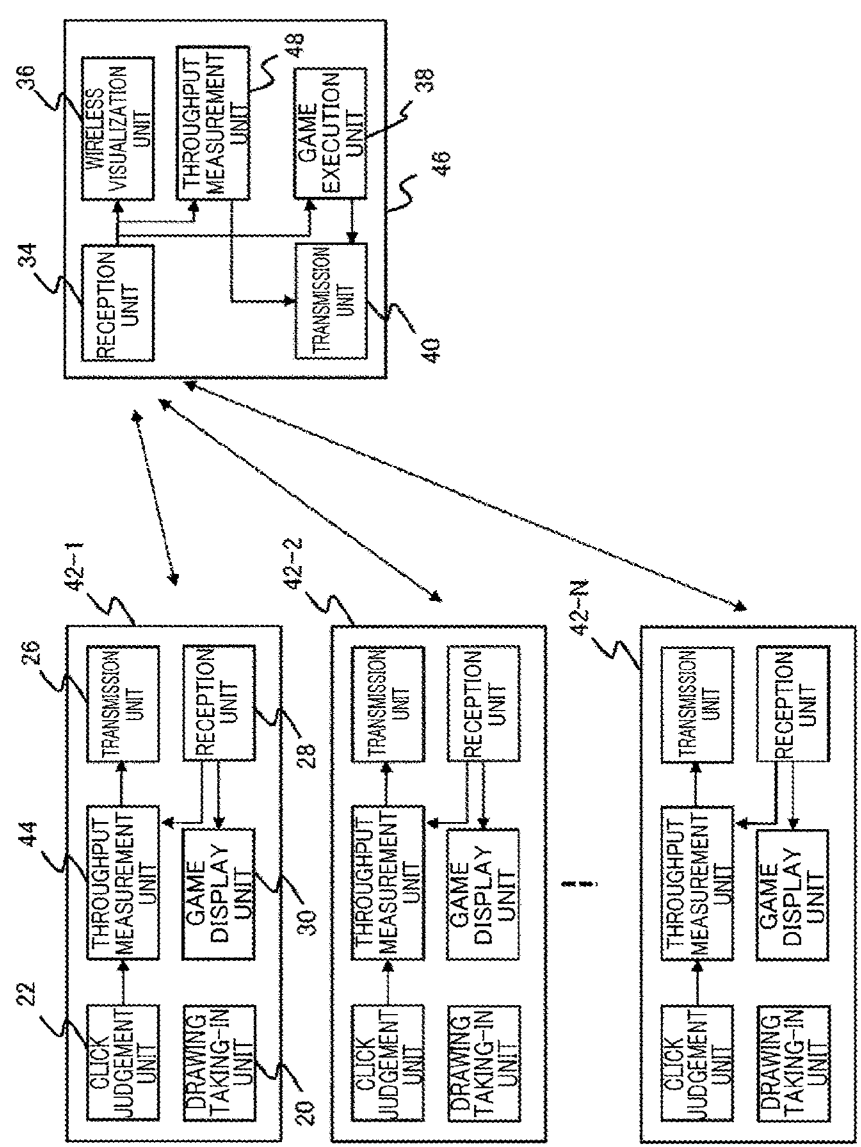
FIG. 6 is a diagram showing a configuration of a design maintenance system according to an embodiment 2 of the present disclosure.

FIG. 6 is a diagram showing an example of a design maintenance system according to the embodiment 2 of the present disclosure. Note that, in FIG. 6, the same elements as those shown in FIG. 3 are designated by a common reference numeral, and the description thereof will be omitted or simplified.

The structure shown in FIG. 6 includes N design maintenance tools 42. The design maintenance tool 42 is a tool used by each worker to execute the active survey. The design maintenance tool 42 has the same configuration as the design maintenance tool 18 in the embodiment 1 except that the channel scan unit 24 is replaced with a throughput measurement unit 44.

The structure shown in FIG. 6 also includes one design maintenance server 46. The design maintenance server 46 has the same configuration as the design maintenance server 32 in the embodiment 1 except that it includes a throughput measurement unit 48.

In the present embodiment, the worker of the active survey takes in the floor drawing into the design maintenance tool 42 via the drawing taking-in unit 20, and clicks the drawing corresponding to the present position of the worker. The click judgement unit 22 detects the click and instructs the throughput measurement to the throughput measurement unit 44.

The throughput measurement unit 44 is connected to an AP having the strongest RSSI, transmits and receives a large amount of packets to and from the throughput measurement unit 48 of the design maintenance server 46, and measures throughput on the basis of the result. Then, the transmission unit 26 of the design maintenance tool 42 transmits wireless information including the result of the measured throughput to the design maintenance server 46.

In the present embodiment, the wireless information includes the following information.

1. A channel number
2. BSSID
3. RSSI
4. Throughput

The design maintenance server 46 transmits the wireless information received by the reception unit 34 to the wireless visualization unit 36 and the game execution unit 38. The game execution unit 38 determines the progress value num of the game based on the transmitted wireless information, as in the embodiment 1. The determined progress value num is provided to the design maintenance tool 42 via the transmission unit 40.

Figure 7:
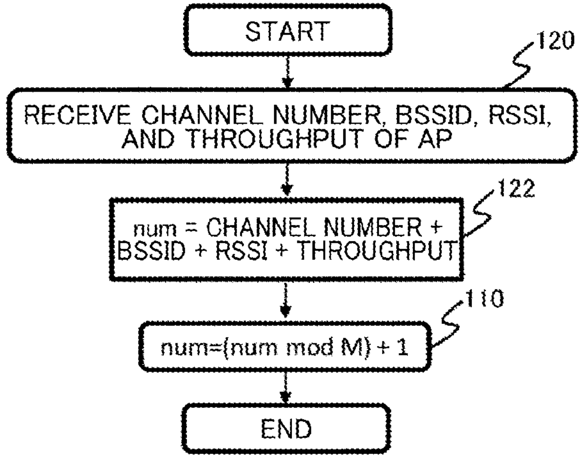
FIG. 7 is a flowchart for explaining a flow of processing performed by the server in order to calculate a progress value necessary for progressing a game according to the embodiment 2 of the present disclosure.

FIG. 7 is a flowchart for explaining an example of a flow of processing executed by the design maintenance server 46 in order to calculate the progress value num of the game according to the present embodiment. The series of processes shown in FIG. 7 is executed to calculate one game progress value num for one time active survey executed by the design maintenance tool 42. Note that among the steps shown in FIG. 7, steps similar to those shown in FIG. 4 are denoted by common reference numerals, and description thereof will be omitted or simplified.

In the active survey, the throughput through the AP having the strongest RSSI is measured by the design maintenance tool 42. In the routine shown in FIG. 7, first, wireless information related to the throughput, that is, wireless information including a channel number, BSSID, RSSI and throughput is received from the design maintenance tool 42 (step 120).

When the above-mentioned processing is completed, the wireless information is converted into the progress value num in accordance with the following equation (4) (step 122). Note that, in the following equation, the method of converting the BSSID into a decimal number is the same as in the embodiment 1.

$$num = \text{channel number} + BSSID + RSSI + \text{throughput} \quad (4)$$

Next, the conversion processing of step 110 is executed based on the num obtained by the above equation (4). That is, the conversion of the above equation (3) is performed to the num of the above equation (4). Thus, the progress value num having any integer value of 1 to M is generated in the same manner as in the embodiment 1. The progress value num thus generated is provided to all of the design maintenance tools 42 as in the embodiment 1.

Specifically, when "the sugoroku game" is selected as an execution game, M=6 is used, and any integer of 1 to 6 is provided to the design maintenance tool 42 as the progress value num. In addition, when "the bingo game" is selected as the execution game, M=75 is used, and any integer of 1 to 75 is provided to the design maintenance tool 42 as the progress value num. Further, when "the raid battle" is selected as the execution game, M=100 is used, and any integer of 1 to 100 is provided to the design maintenance tool 42 as the progress value num.

As described above, according to the design maintenance system according to the present embodiment, the progress value num of the game can be generated based on the numerical value to be handled in accordance with the design maintenance work of the wireless equipment, as in the embodiment 1. Then, by providing the progress value to the design maintenance tool 42, game-like elements can be given to the design maintenance work.

Embodiment 3

Next, an embodiment 3 of the present disclosure will be described with reference to FIGS. 8 and 9 together with FIGS. 4 and 5. The design maintenance system of the present embodiment is used for performing the passive survey, as in the embodiment 1.

In the above-described embodiments 1 and 2, when a plurality of workers simultaneously performs works, the more the number of clicks by the worker is larger, the more the game progresses earlier. This embodiment is characterized in that a concept of "game score reflection right" is introduced in order to make the progress degree of the game uniform among a plurality of workers.

The game score reflection right is sequentially given to each of the plurality of workers. Then, each worker is provided with the progress value num only when the wireless information is transmitted under a situation having the game score reflection right. In this case, the progress degree of the game becomes uniform regardless of the number of clicks, and the occurrence of such a situation that only a game of a part of workers is projected and progressed can be avoided.

Figure 8:
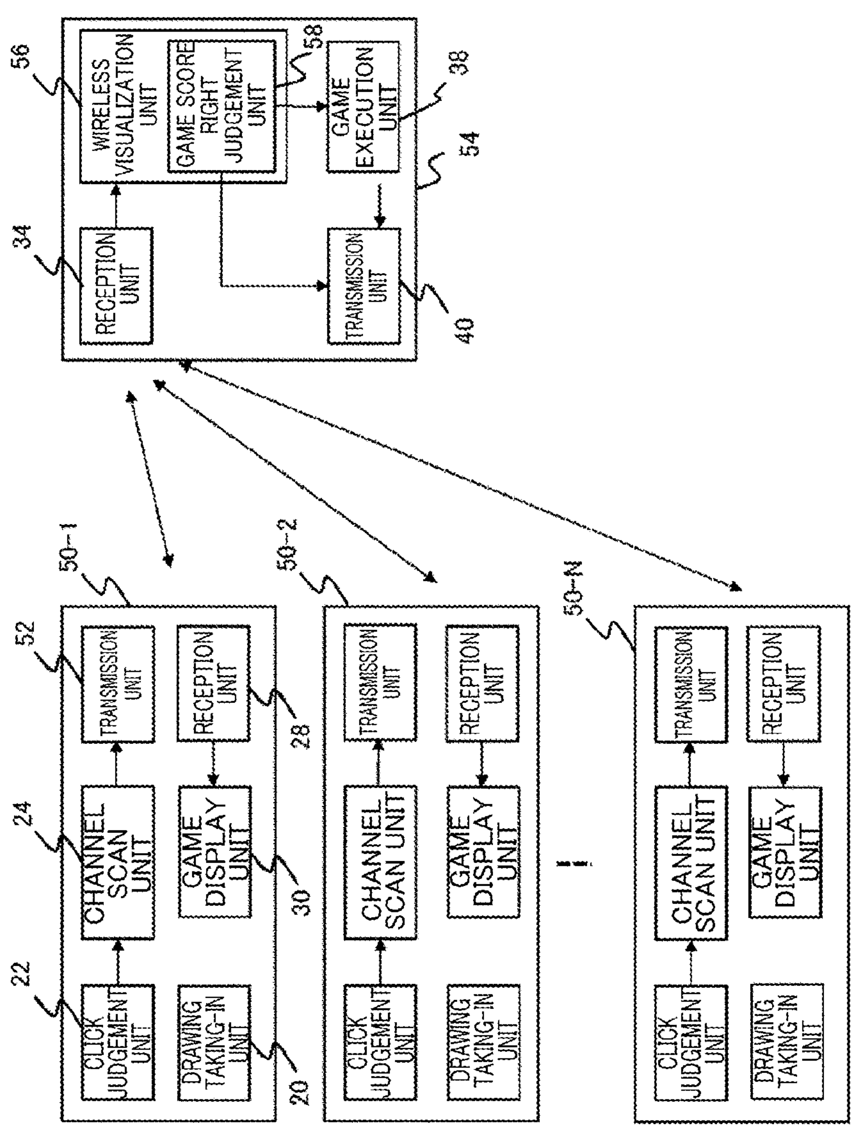
FIG. 8 is a diagram showing a configuration of a design maintenance system according to an embodiment 3 of the present disclosure.

FIG. 8 is a diagram showing a configuration example of a design maintenance system according to the present embodiment. A design maintenance tool 50 shown in FIG. 8 is the same as the design maintenance tool 18 shown in FIG. 3 except that the transmission unit 26 is replaced with a transmission unit 52. In addition, a design maintenance server 54 shown in FIG. 8 is the same as the design maintenance server 32 shown in FIG. 3 except that the wireless visualization unit 36 is replaced with a wireless visualization unit 56. Note that, in FIG. 8, the same elements as those shown in FIG. 3 are designated by a common reference numeral, and the description thereof will be omitted or simplified.

In the present embodiment, when the game score reflection right is given to the design maintenance tool 50, the transmission unit 52 of the design maintenance tool 50 transmits the game score reflection right to the design maintenance server 54 together with the wireless information. The game score reflection right possessed by the design maintenance tool 50 disappears by the transmission.

When receiving the wireless information from the design maintenance tool 50, the design maintenance server 54 provides the information to the wireless visualization unit 56. In this embodiment, the wireless visualization unit 56 includes a game score right judgement unit 58. The game score right judgement unit 58 confirms whether or not the received information includes the game score reflection right. Then, when the game score reflection right is recognized, the received wireless information is provided to the game execution unit 38, and an identification number of the design maintenance tool to which the game score reflection right should be given next is transmitted to the transmission unit 40.

When receiving the wireless information, the game execution unit 38 calculates the progress value num of the game according to the routine shown in FIG. 4, as in the embodiment 1. Then, the calculated progress value num is transmitted to the transmission unit 40.

When receiving the progress value num, the transmission unit 40 provides the progress value num to all of the N design maintenance tools 50 together with the identification number of the design maintenance tool 50 possessing the game score reflection right next.

Figure 9:
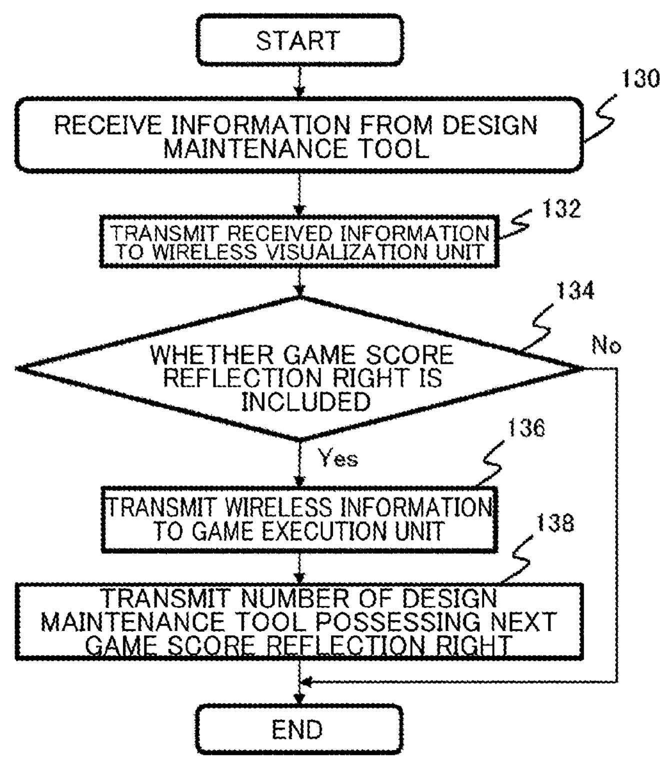
FIG. 9 is a flowchart for explaining a flow of processing performed by the server in order to calculate a progress value necessary for progressing a game according to the embodiment 3 of the present disclosure.

FIG. 9 is a flow chart for explaining a flow of processing executed by the design maintenance server 54 in order to realize the above-mentioned function according to the present embodiment. In the routine shown in FIG. 9, first, the information transmitted from the design maintenance tool 50 is received by the reception unit 34 of the design maintenance server 54 (step 130).

Next, the received information is transmitted to the wireless visualization unit 56 (step 132). The wireless visualization unit 56 executes processing necessary for visualization on the basis of the wireless information included in the information.

The wireless visualization unit 56 further discriminates whether or not the received information includes the game score reflection right (step 134). As a result, when it is discriminated that the game score reflection right is not included, the processing of this routine is terminated.

On the other hand, when the presence of the game score reflection right is recognized, the wireless information is transmitted to the game execution unit 38 (step 136). Thus, the game execution unit 38 calculates the game progress value num according to the routine shown in FIG. 4.

Further, the identification number of the design maintenance tool 50 to which the game score reflection right should be given next is transmitted to the transmission unit 40 (step 138).

Thereafter, the transmission unit 40 transmits the progress value num of the game and the identification number of the design maintenance tool 50 possessing the game score reflection right next to all of the N design maintenance tools 50. Thus, the game is advanced in the design maintenance tool 50. In addition, the information of the design maintenance tool 50 to which the game score reflection right is newly given is displayed on all the design maintenance tools 50.

Modification Example of Embodiment 2

Incidentally, in the above-described embodiment 3, the concept of the game score reflection right is combined with the design maintenance system of the embodiment 1, that is, a system for implementing the passive survey. However, the present disclosure is not limited thereto. The concept of the game score reflection right may be combined with the design maintenance system of the embodiment 2, that is, a system for performing the active survey.

Example 1 of Game

Next, a first example of game capable of being performed on the design maintenance system according to the embodiment 3 will be described with reference to FIGS. 10 to 12C.

Figure 10:
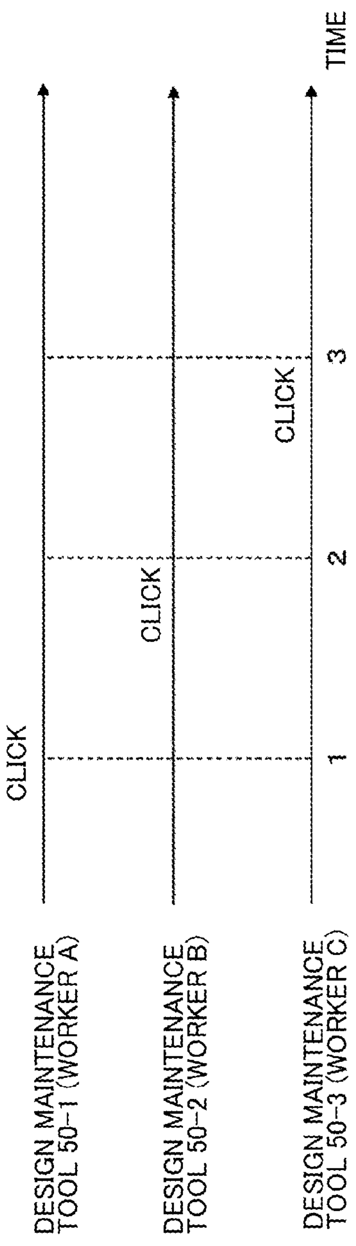
FIG. 10 is a timing chart for explaining an example of performing a sugoroku game on the design maintenance system according to the embodiment 3 of the present disclosure.

FIG. 10 is a timing chart showing the timing of the operation according to the present example. In the present example, an example in which workers A, B and C participate in the sugoroku game using the design maintenance tools 50-1, 50-2 and 50-3, respectively, will be described. Since the type of the game is sugoroku, the design maintenance server 54 uses "6" as an M value.

In the example shown in FIG. 10, the workers A, B, and C perform a click to instruct start of the channel scan at time points t=1, t=2 and t=3, respectively. It is assumed that the worker A possesses the game score reflection right at the time t=1.

[Turn of Worker A]

When t=1 is satisfied, the worker A clicks a location on the drawing which coincides with the current position of the worker. The click judgement unit 22 of the design maintenance tool 50-1 detects the click and instructs the channel scan unit 24 to execute the channel scan.

FIG. 11 shows wireless information obtained by the design maintenance tools 50-1, 50-2, 50-3 by clicking at time points t=1, t=2, and t=3. In this case, the design maintenance tools 50-1, 50-2, and 50-3 acquire wireless information about each of the two APs as a result of scanning all the channels.

At the time point t=1, the channel scan unit 24 of the design maintenance tool 50-1 obtains two pieces of wireless information shown in the upper stage shown in FIG. 11. The wireless information is transmitted to the design maintenance server 54 together with the game score reflection right.

The reception unit 34 of the design maintenance server 54 transmits the received information to the wireless visualization unit 56. In this case, since the game score reflection right is included in the received information, the wireless information is also provided to the game execution unit 38. At the same time, the identification number "2" of the design maintenance tool 50-2 to which the game score reflection right should be given next is transmitted to the transmission unit 40.

The game execution unit 38 calculates the progress value num of the game according to the flowchart shown in FIG. 4. The operation based on the channel number, BSSID and RSSI of the first AP acquired by the design maintenance tool 50-1 is performed as follows (refer to the step 106 shown in FIG. 4).

$$num = num + \text{channel number\_1} + \text{BSSID\_1} + \text{RSSI\_1} = 0 + 36 + 78 - 40 = 74 \tag{5}$$

$$\text{Here, BSSID\_1} = 1 + 2 + 3 + 4 + 5 + 6 + 10 + 7 + 11 + 8 + 12 + 9 = 78$$

is satisfied.

The operation based on the channel number, BSSID and RSSI of the second AP is performed as follows (refer to the step 106 shown in FIG. 4).

$$num = num + \text{channel number\_2} + \text{BSSID\_2} + \text{RSSI\_2} = 74 + 40 + 83 - 45 = 152 \quad (6)$$

Here, BSSID_2 = 1 + 2 + 3 + 4 + 5 + 6 + 10 + 11 + 12 + 7 + 14 + 8 = 83

By adding 1 to a remainder obtained by dividing a num "152" obtained by the above operation by a M value "6", the progress value num=3 is obtained (see FIG. 4 and step 110). The game execution unit 38 transmits the progress value num=3 to the transmission unit 40. The transmission unit 40 transmits the progress value num=3 and the identification number "2" of the design maintenance tool possessing the game score reflection right to all of three design maintenance tools 50 participating in the game.

When receiving the information from the design maintenance server 54, the reception unit 28 of the design maintenance tool 50 transmits the progress value num=3 to the game display unit 30. The game display unit 30 receives the information and displays a game screen on a display.

Figure 12A:
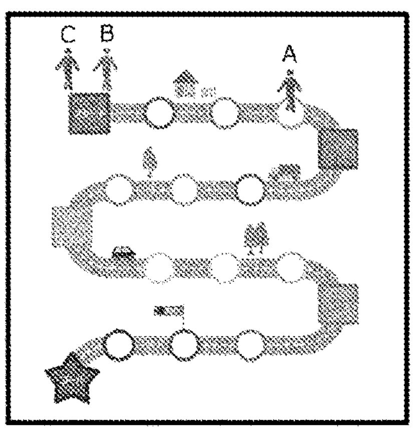
FIG. 12A is a diagram showing how a piece of a worker A progresses in the sugoroku game displayed on the design maintenance tool upon receiving the measurement result shown in the upper stage shown in FIG. 11.

FIG. 12A shows an example of the game screen displayed on the display of each design maintenance tool 50 due to the wireless information transmitted from the design maintenance tool 50-1 possessing the game score reflection right at the time point t=1. Here, since the progress value num is "3", the worker A moves forward three spaces. The worker B to which the game score reflection right is newly given is displayed separately from the workers A and C. The display is distinguished, for example, by changing the display color.

[Turn of Worker B]

When the worker B clicks its own current position on the drawing at the time point t=2, the click judgement unit 22 of the design maintenance tool 50-2 instructs the channel scan unit 24 to execute the channel scan. The channel scan unit 24 obtains two pieces of wireless information shown in the middle stage shown in FIG. 11, and transmits the information and the game score reflection right to the design maintenance server 54.

Since the game score reflection right is included in the received information, the wireless information is provided to the game execution unit 38, and the number "3" of the wireless design maintenance tool to which the game score reflection right is given next is transmitted to the transmission unit 40 in the design maintenance server 54. Then, the game execution unit 38 calculates the progress value num of the game in accordance with the flowchart shown in FIG. 4 as follows.

The operation based on the channel number, BSSID and RSSI of the first AP acquired by the design maintenance tool 50-2 is performed as follows (refer to the step 106 shown in FIG. 4).

$$num = num + \text{channel number\_1} + \text{BSSID\_1} + \text{RSSI\_1} = 0 + 44 + 71 - 48 = 67 \quad (7)$$

Here, BSSID_1 = 1 + 2 + 3 + 4 + 5 + 6 + 1 + 7 + 14 + 8 + 13 + 7 = 71

The operation based on the channel number, BSSID and RSSI of the second AP is performed as follows (refer to the step 106 shown in FIG. 4).

$$num = num + \text{channel number\_2} + \text{BSSID\_2} + \text{RSSI\_2} = 67 + 48 + 66 + 50 = 131 \quad (8)$$

Here, BSSID_2 = 1 + 2 + 3 + 4 + 5 + 6 + 15 + 3 + 11 + 1 + 12 + 3 = 66

By adding 1 to the remainder obtained by dividing num "131" obtained by the above calculation by M value "6", a progress value num=6 is obtained (refer to the step 110 shown in FIG. 4). The game execution unit 38 transmits the progress value num=6 to the transmission unit 40. A transmission unit 40 transmits a progress value num=6 and an identification number "3" of a design maintenance tool having a game score reflection right to all of three design maintenance tools 50 participating in the game.

When receiving the information from the design maintenance server 54, the reception unit 28 of the design maintenance tool 50 transmits the progress value num=6 to the game display unit 30. The game display unit 30 receives the information and displays the game screen on the display.

Figure 12B:
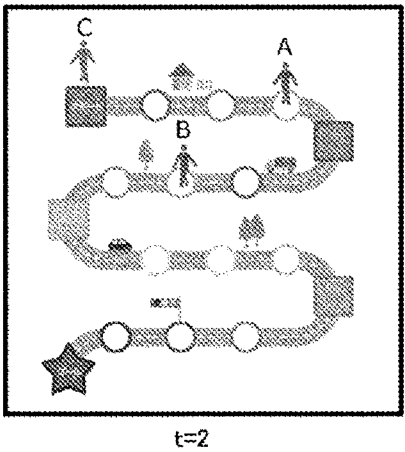
FIG. 12B is a diagram showing how a piece of a worker B progresses in the sugoroku game displayed on the design maintenance tool upon receiving the measurement result shown in the upper stage shown in FIG. 11.

FIG. 12B shows an example of the game screen displayed on the display of each design maintenance tool 50 due to the wireless information transmitted from the design maintenance tool 50-2 possessing the game score reflection right at the time point t=2. In this case, since the progress value num is "6", the worker B moves forward 6 spaces. In addition, the worker C newly given the game score reflection right is displayed in a color different from those of the workers A and B.

[Turn of Worker C]

When the worker C clicks the present position on the drawing at the time point t=3, the click judgement unit 22 of the design maintenance tool 50-3 instructs the channel scan unit 24 to execute the channel scan. The channel scan unit 24 obtains two pieces of wireless information shown in the lower stage shown in FIG. 11, and transmits the information and the game score reflection right to the design maintenance server 54.

Since the game score reflection right is included in the received information, the wireless information is provided to the game execution unit 38, and the number "1" of the wireless design maintenance tool to which the game score reflection right is given next is transmitted to the transmission unit 40 in the design maintenance server 54. The game execution unit 38 calculates the progress value num of the game in accordance with the flowchart shown in FIG. 4 as follows.

The operation based on the channel number, BSSID and RSSI of the first AP acquired by the design maintenance tool 50-3 is performed as follows (refer to the step 106 shown in FIG. 4).

$$num = num + \text{channel number\_1} + \text{BSSID\_1} + \text{RSSI\_1} = 0 + 36 + 66 + 40 = 62 \quad (9)$$

Here, BSSID_1 = 1 + 2 + 3 + 4 + 5 + 6 + 3 + 1 + 4 + 12 + 10 + 1 = 66

The operation based on the channel number, BSSID and RSSI of the second AP is performed as follows (refer to the step 106 shown in FIG. 4).

$$num = num + \text{channel number\_2} + \text{BSSID\_2} + \text{RSSI\_2} = 62 + 48 + 68 - 45 = 133 \quad (10)$$

$$\text{Here, BSSID\_2} = 1 + 2 + 3 + 4 + 5 + 6 + 12 + 2 + 14 + 1 + 13 + 5 = 68$$

By adding 1 to the remainder obtained by dividing the num "133" obtained by the above calculation by the M value "6", the progress value num=2 is obtained (refer to the step 110 shown in FIG. 4). The game execution unit 38 transmits the progress value num=2 to the transmission unit 40. The transmission unit 40 transmits the progress value num=2 and the identification number "1" of the design maintenance tool possessing the game score reflection right to all of three design maintenance tools 50 participating in the game.

When receiving the above information from the design maintenance server 54, the reception unit 28 of the design maintenance tool 50 transmits the progress value num=2 to the game display unit 30. The game display unit 30 receives the information and displays the game screen on the display.

Figure 12C:
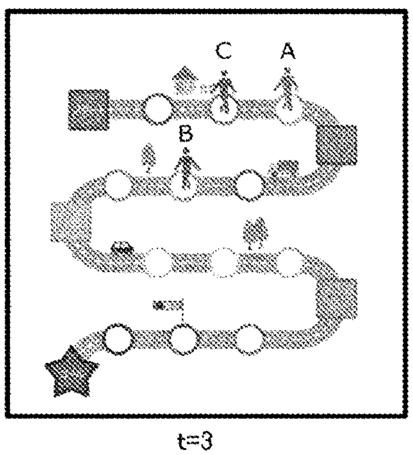
FIG. 12C is a diagram showing how a piece of a worker C progresses in the sugoroku game displayed on the design maintenance tool upon receiving the measurement result shown in the upper stage shown in FIG. 11.

FIG. 12C shows an example of the game screen displayed on the display of each design maintenance tool 50 due to the wireless information transmitted from the design maintenance tool 50-3 possessing the game score reflection right at the time point t=3. Here, since the progress value num is "2", the worker C moves forward two spaces. In addition, the worker A to which the game score reflection right is newly given is displayed in a color different from those of the workers B and C.

Example 2 of Game

Next, a second example of game capable of being performed on the design maintenance system according to the present disclosure will be described with reference to FIGS. 13 to 15C. Here, a case of playing the game by a design maintenance system in which the concept of the game score reflection right is applied to the technique of the embodiment 2 on the assumption of the active survey will be described.

Hereinafter, a design maintenance tool used in the present example is represented by a reference numeral "50'". In addition, a design maintenance server used in the present example is denoted by a reference numeral "54'". The design maintenance tool 50' has a configuration in which the channel scan unit 24 is replaced with the throughput measurement unit 44 shown in FIG. 6 in the design maintenance tool 50 shown in FIG. 8. In addition, the design maintenance server 54' has a configuration in which the throughput measurement unit 48 shown in FIG. 6 is added to the design maintenance server 54 shown in FIG. 8.

Figure 13:
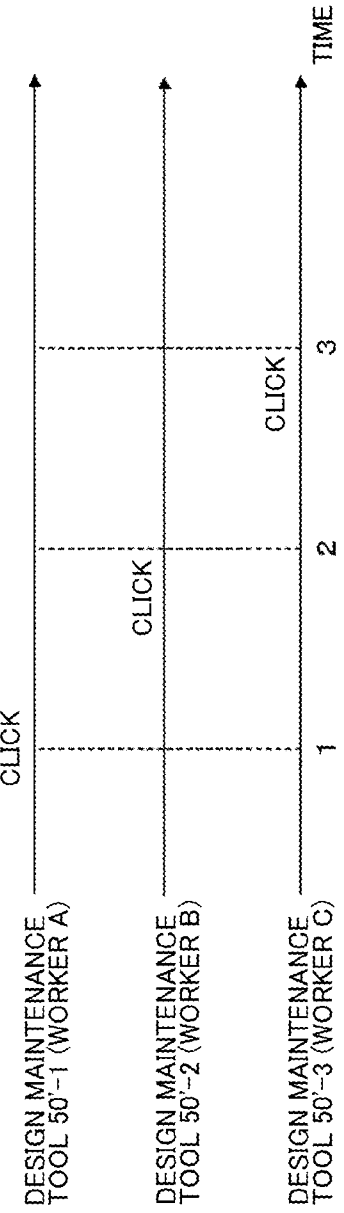
FIG. 13 is a timing chart for explaining an example of playing the sugoroku game on the design maintenance system applying the active survey according to the embodiment 3 of the present disclosure.

FIG. 13 is a timing chart showing the timing of the operation in the present example. In the present example, an example in which the workers A, B and C participate in the sugoroku game by using the design maintenance tools 50'-1, 50'-2, and 50'-3, respectively, will be described. Since the type of the game is the sugoroku game, the M value is "6".

In the example shown in FIG. 13, the workers A, B, and C perform a click to instruct start of the channel scan at time points t=1, t=2 and t=3, respectively. It is assumed that the worker A possesses the game score reflection right at the time point t=1.

[Turn of Worker A]

When t=1 is satisfied, the worker A clicks a location on the drawing which coincides with the current position of the worker. The click judgement unit 22 of the design maintenance tool 50'-1 detects the click and instructs the throughput measurement unit 44 to measure the throughput. Thus, a large amount of packets are transmitted and received between the throughput measurement unit 44 of the design maintenance tool 50'-1 and the throughput measurement unit 48 of the design maintenance server 54', and the throughput is measured.

FIG. 14 shows wireless information acquired by each the design maintenance tools 50'-1, 50'-2, and 50'-3 due to clicking at time points t=1, t=2 and t=3. At the time point t=1, the throughput measurement unit 44 of the design maintenance tool 50'-1 obtains the wireless information shown in the upper stage shown in FIG. 14. The wireless information is transmitted to the design maintenance server 54' together with the game score reflection right.

The design maintenance server 54' transmits the received information to the wireless visualization unit 56. In this case, since the game score reflection right is included in the received information, the wireless information is also provided to the game execution unit 38. At the same time, the identification number "2" of the design maintenance tool 50'-2 to which the game score reflection right should be given next is transmitted to the transmission unit 40.

The game execution unit 38 calculates the progress value num of the game according to the flowchart shown in FIG. 7. Thus, the channel number, the BSSID, the RSSI, and the throughput acquired by the design maintenance tool 50'-1 are summed up as follows (refer to the step 122 shown in FIG. 7).

$$num = \text{channel number} + BSSID + RSSI + \text{throughput} = 36 + 78 - 40 + 82300000 = 82300074 \quad (11)$$

$$\text{Here, } BSSID = 1 + 2 + 3 + 4 + 5 + 6 + 10 + 7 + 11 + 8 + 12 + 9 = 78$$

By adding 1 to the remainder obtained by dividing the num "82300074" obtained by the above operation by the M value "6", the progress value num=1 is obtained (refer to the step 110 shown in FIG. 7). The game execution unit 38 transmits the progress value num=1 to the transmission unit 40. The transmission unit 40 transmits the progress value num=1 and the identification number "2" of the design maintenance tool possessing the game score reflection right to all of three design maintenance tools 50' participating in the game.

When receiving the above information from the design maintenance server 54', the reception unit 28 of the design maintenance tool 50' transmits the progress value num=1 to the game display unit 30. The game display unit 30 receives the information and displays the game screen on the display.

Figure 15A:
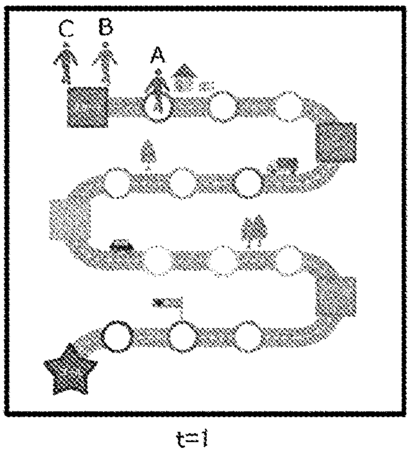
FIG. 15A is a diagram showing how the piece of the worker A progresses on the sugoroku game displayed on the design maintenance tool upon receiving the measurement result shown in the upper stage shown in FIG. 11.

FIG. 15A shows an example of the game screen displayed on the display of each design maintenance tool 50', which is caused by the wireless information transmitted from the design maintenance tool 50'-1 possessing the game score reflection right at the time point t=1. In this case, since the progress value num is "1", the worker A moves forward one space. In addition, the worker B to which the game score reflection right is newly given is displayed in a color different from those of the workers A and C.

[Turn of Worker B]

When the worker B clicks its own current position on the drawing at the time point t=2, the click judgement unit 22 of the design maintenance tool 50'-2 instructs the throughput measurement unit 44 to measure the throughput. The throughput measurement unit 44 obtains the wireless information shown in the middle stage shown in FIG. 14, and transmits the information and the game score reflection right to the design maintenance server 54'.

Since the game score reflection right is included in the received information, the wireless information is provided to the game execution unit 38, and the number "3" of the wireless design maintenance tool to which the game score reflection right is given next is transmitted to the transmission unit 40 in the design maintenance server 54'. The game execution unit 38 calculates the progress value num of the game in accordance with the flowchart shown in FIG. 7 as follows.

$$num = \text{channel number} + BSSID + RSSI + \text{throughput} = 44 + 71 - 48 + 61500000 = 61500067 \quad (12)$$

$$\text{Here, } BSSID = 1 + 2 + 3 + 4 + 5 + 6 + 1 + 7 + 14 + 8 + 13 + 7 = 71$$

By adding 1 to the remainder obtained by dividing the num "61500067" obtained by the above operation by the M value "6", the progress value num=2 is obtained (refer to the step 110 shown in FIG. 7). The game execution unit 38 transmits the progress value num=2 to the transmission unit 40. The transmission unit 40 transmits the progress value num=2 and the identification number "3" of the design maintenance tool possessing the game score reflection right to all of three design maintenance tools 50' participating in the game.

When receiving the above information from the design maintenance server 54', the reception unit 28 of the design maintenance tool 50' transmits the progress value num=2 to the game display unit 30. The game display unit 30 receives the information and displays the game screen on the display.

Figure 15B:
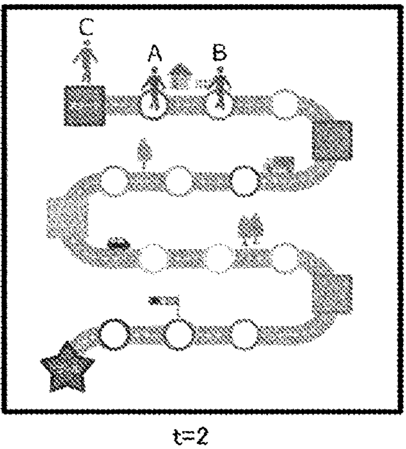
FIG. 15B is a diagram showing how the piece of the worker B progresses on the sugoroku game displayed on the design maintenance tool upon receiving the measurement result shown in the upper stage shown in FIG. 11.

FIG. 15B shows an example of the game screen displayed on the display of each design maintenance tool 50', which is caused by the wireless information transmitted from the design maintenance tool 50'-2 possessing the game score reflection right at the time point t=2. Here, since the progress value num is "2", the worker B moves forward two spaces. In addition, the worker C newly given the game score reflection right is displayed in a color different from those of the workers A and B.

[Turn of Worker C]

When the worker C clicks its own current position on the drawing at the time point t=3, the click judgement unit 22 of the design maintenance tool 50'-3 instructs the throughput measurement unit 44 to measure the throughput. The throughput measurement unit 44 obtains the wireless information shown in the lower stage shown in FIG. 14, and transmits the information and the game score reflection right to the design maintenance server 54'.

Since the game score reflection right is included in the received information, the wireless information is provided to the game execution unit 38, and the number "1" of the wireless design maintenance tool to which the game score reflection right is given next is transmitted to the transmission unit 40 in the design maintenance server 54'. The game execution unit 38 calculates the progress value num of the game in accordance with the flowchart shown in FIG. 7 as follows.

$$num = \text{channel number} + BSSID + RSSI + \text{throughput} = 36 + 66 - 40 + 75800000 = 75800062 \quad (13)$$

$$\text{Here, BSSID\_1} = 1 + 2 + 3 + 4 + 5 + 6 + 3 + 1 + 4 + 12 + 10 + 1 = 66$$

By adding 1 to the remainder obtained by dividing the num "75800062" obtained by the above calculation by the M value "6", the progress value num=5 is obtained (refer to step 110 shown in FIG. 7). The game execution unit 38 transmits the progress value num=5 to the transmission unit 40. The transmission unit 40 transmits the progress value num=5 and the identification number "1" of the design maintenance tool possessing the game score reflection right to all of three design maintenance tools 50' participating in the game.

When receiving the above information from the design maintenance server 54', the reception unit 28 of the design maintenance tool 50' transmits the progress value num=5 to the game display unit 30. The game display unit 30 receives the information and displays the game screen on the display.

Figure 15C:
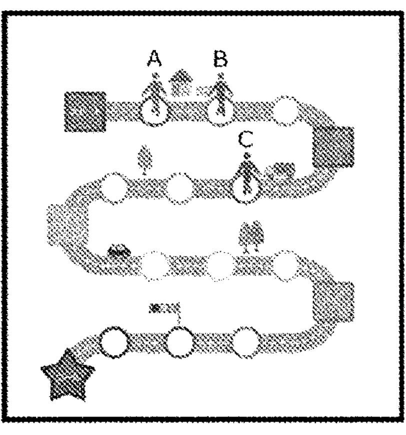
FIG. 15C is a diagram showing how the piece of the worker C progresses on the sugoroku game displayed on the design maintenance tool upon receiving the measurement result shown in the upper stage shown in FIG. 11.

FIG. 15C shows an example of the game screen displayed on each display of the design maintenance tool 50' due to the wireless information transmitted from the design maintenance tool 50'-3 possessing the game score reflect right at the time point t=3. In this case, since the progress value num is "5", the worker C moves forward 5 spaces. In addition, the worker A to which the game score reflection right is newly given is displayed in a color different from those of the workers B and C.

As described above, according to the embodiment of the present disclosure, the elements of the game can be added to the design maintenance work of the wireless facility. More specifically, the execution result of the game can be displayed to all the workers participating in the work in real time. This makes it possible for the workers to perform the site survey with pleasure. In general, the site survey work is a long-time work, but according to the design maintenance system of the present disclosure, the workers can continue the work without getting bored.

Modification Example Included in Present Disclosure

Incidentally, in the above-described embodiments 1 to 3, it is assumed that a plurality of design maintenance tool is included in the design maintenance system, but the present disclosure is not limited thereto. Only one design maintenance tool included in the design maintenance system may be used.

In addition, in the above-described embodiments 1 to 3, it is assumed that the design maintenance server transmits the generated progress value num to all design maintenance tools participating in the game, but the present disclosure is not limited thereto. For example, when a game of a type such as a poker game in which a hand is not disclosed to other players is played, the progress value num may be returned only to the design maintenance tool which has issued the wireless information.

In addition, in the above-described embodiments 1 to 3, it is assumed that the progress of the game is displayed on the display of the design maintenance tool to inform the worker of the progress, but the present disclosure is not limited thereto. The progress of the game may be informed to the worker by another method such as sound or light.

REFERENCE SIGNS LIST

18, 18-1 to 18-N, 42, 42-1 to 42-N, 50, 50-1 to 50-N Design maintenance tool

32, 46, 54 Design maintenance server

30 Game display unit

38 Game execution unit

58 Game score right judgement unit

The invention claimed is:

1. A design maintenance system used for design maintenance work of wireless equipment, the design maintenance system comprising:
   - a design maintenance tool configured to be used by a worker of the design maintenance work; and
   - a design maintenance server configured to transmit and receive information to and from the design maintenance tool by a communication, wherein:
     - the design maintenance tool is configured to collect and transmit wireless information measured in association with the design maintenance work to the design maintenance server, wherein the collection of wireless information includes a radio wave survey that reveals a channel number, a Basic Service Set Identifier (BSSID), and a Received Signal Strength Indicator (RSSI) of an access point of a wireless local area network (LAN), and wherein the wireless information transmitted includes the channel number, the BSSID, and the RSSI,
     - the design maintenance server is configured to receive the wireless information, convert the BSSID into a decimal number, and calculate a progress value based on a sum of the channel number, the decimal value resulting from converting the BSSID, and the RSSI,
     - the design maintenance server is configured to transmit the progress value to the design maintenance tool, and
     - the design maintenance tool is further configured to progress the game by using the received progress value, and notify the worker of a progress state of the game.

2. The design maintenance system of wireless equipment according to claim 1, wherein
   - the design maintenance system includes a plurality of design maintenance tools participating in a game,
   - each of the plurality of design maintenance tools is used by a different worker,
   - the design maintenance server is configured to calculate the progress value based on the wireless information received from one design maintenance tool, and
   - the design maintenance server is configured to transmit the progress value to all of the plurality of design maintenance tools.

3. The design maintenance system of wireless equipment according to claim 1, wherein
   - the design maintenance system includes a plurality of design maintenance tools participating in a game,
   - each of the plurality of design maintenance tools is used by a different worker,
   - each of the plurality of design maintenance tools is configured to transmit information on a game score reflection right together with the wireless information to the design maintenance server,
   - the design maintenance server is configured to
     - sequentially give game score reflection right to each of the plurality of design maintenance tools,
     - discriminate whether or not information of the game score reflection right is attached to received wireless information, and
     - permit execution of the progress value calculation processing only for wireless information to which the game score reflection right is permitted to be attached.

4. The design maintenance system of wireless equipment according to claim 1, wherein
   - the design maintenance server is configured to set a value obtained by converting the wireless information into any integer value of 1 to M as the progress value,
   - the design maintenance tool is further configured to transmit information specific to a type of the game to be executed to the design maintenance server, and
   - the design maintenance server is further configured to determine a value of the M based on the specific information.

5. The design maintenance system of wireless equipment according to claim 1, wherein
   - the design maintenance work includes:
     - a passive survey for surveying a channel number, Basic Service Set Identifier (BSSID), and Received Signal Strength Indicator (RSSI) for an access point of a wireless local area network (LAN), or
     - an active survey for surveying the channel number, BSSID, RSSI, and throughput for the access point of the wireless LAN.

6. A design maintenance method applied to design maintenance work of wireless equipment, the design maintenance method comprising:
   - causing a design maintenance tool collect and to transmit wireless information measured in association with the design maintenance work to a design maintenance server by using the design maintenance tool used by a worker of the design maintenance work and the design maintenance server that transmits and receives information to and from the design maintenance tool by a communication, wherein the collection of wireless information includes a radio wave survey that reveals a channel number, a Basic Service Set Identifier (BSSID), and a Received Signal Strength Indicator (RSSI) of an access point of a wireless local area network (LAN), and wherein the wireless information transmitted includes the channel number, the BSSID, and the RSSI;
   - causing the design maintenance server to receive the wireless information, and convert the BSSID into a decimal number;
   - causing the design maintenance server to calculate a progress value based on a sum of the channel number, the decimal value resulting from converting the BSSID, and the RSSI;
   - causing the design maintenance server to transmit the progress value to the design maintenance tool;
   - causing the design maintenance tool to progress the game by using the received progress value; and
   - causing the design maintenance tool to inform the worker of a progress state of the game.

* * * * *